(12) United States Patent
Phanopoulos et al.

(10) Patent No.: US 9,752,013 B2
(45) Date of Patent: Sep. 5, 2017

(54) COMPOSITION COMPRISING SILYLATED POLYMERS

(71) Applicant: Huntsman International LLC, The Woodlands, TX (US)

(72) Inventors: Christopher Phanopoulos, Moorsel (BE); Servaas Holvoet, Veltem-Beisem (BE); Fabrice Desesquelles, Brussels (BE); Alexander Rene Klein, Hoegaarden (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 14/782,342

(22) PCT Filed: Apr. 1, 2014

(86) PCT No.: PCT/EP2014/056504
§ 371 (c)(1),
(2) Date: Oct. 5, 2015

(87) PCT Pub. No.: WO2014/173638
PCT Pub. Date: Oct. 30, 2014

(65) Prior Publication Data
US 2016/0046793 A1 Feb. 18, 2016

(30) Foreign Application Priority Data

Apr. 25, 2013 (EP) .................... 13165285

(51) Int. Cl.
| | | |
|---|---|---|
| C08G 77/08 | (2006.01) | |
| C08K 5/56 | (2006.01) | |
| C08G 18/48 | (2006.01) | |
| C08G 18/76 | (2006.01) | |
| C08G 18/28 | (2006.01) | |
| C08K 5/549 | (2006.01) | |
| C09J 175/04 | (2006.01) | |
| C09D 175/04 | (2006.01) | |
| C08G 77/18 | (2006.01) | |
| C08G 77/16 | (2006.01) | |
| C08G 101/00 | (2006.01) | |

(52) U.S. Cl.
CPC .............. *C08K 5/56* (2013.01); *C08G 18/289* (2013.01); *C08G 18/4825* (2013.01); *C08G 18/7671* (2013.01); *C08K 5/549* (2013.01); *C09D 175/04* (2013.01); *C09J 175/04* (2013.01); *C08G 77/08* (2013.01); *C08G 77/16* (2013.01); *C08G 77/18* (2013.01); *C08G 2101/0008* (2013.01); *C08G 2101/0016* (2013.01); *C08G 2101/0025* (2013.01); *C08G 2190/00* (2013.01)

(58) Field of Classification Search
CPC .............. C08G 18/718; C08G 18/4825; C08G 18/7671; C08G 18/289; C08G 77/08; C08G 77/16; C08G 77/18
See application file for complete search history.

(56) References Cited

U.S. PATENT DOCUMENTS

| | | | |
|---|---|---|---|
| 4,333,867 A | | 6/1982 | Sauntson |
| 5,994,474 A | | 11/1999 | Wey et al. |
| 8,232,362 B2 | * | 7/2012 | Yang ...................... C08G 18/10 528/19 |
| 2002/0137625 A1 | | 9/2002 | Jost et al. |
| 2004/0071977 A1 | | 4/2004 | Shah |
| 2004/0260037 A1 | | 12/2004 | Schindler et al. |
| 2005/0192364 A1 | * | 9/2005 | Lichtenhan .......... C23C 18/1212 521/50 |
| 2007/0060732 A1 | | 3/2007 | Yang et al. |
| 2008/0125539 A1 | | 5/2008 | Mack |
| 2010/0124123 A1 | * | 5/2010 | Lee .................... G11C 16/3459 365/185.19 |
| 2010/0125123 A1 | | 5/2010 | Lichtenhan et al. |
| 2011/0028640 A1 | | 2/2011 | Klein et al. |
| 2011/0245144 A1 | | 10/2011 | Messner et al. |
| 2012/0298299 A1 | | 11/2012 | Rutz et al. |
| 2013/0079538 A1 | | 3/2013 | Phanopoulos et al. |

FOREIGN PATENT DOCUMENTS

| | | |
|---|---|---|
| WO | 2007/041344 | 4/2007 |
| WO | 2007/050538 | 5/2007 |
| WO | 2008/144735 | 11/2008 |
| WO | 2009/133061 | 11/2009 |
| WO | 2011/075254 | 6/2011 |

* cited by examiner

*Primary Examiner* — Margaret Moore
(74) *Attorney, Agent, or Firm* — Huntsman International LLC; Robert Diaz

(57) ABSTRACT

The present invention relates to a tin-free composition comprising at least one silylated polymer and at least one tin-free polyhedral oligomeric metallo silsesquioxane. The present invention also relates to a process of curing a composition comprising a silylated polymer comprising the step of: contacting a silylated polymer with a tin-free polyhedral oligomeric metallo silsesquioxane.

20 Claims, 1 Drawing Sheet

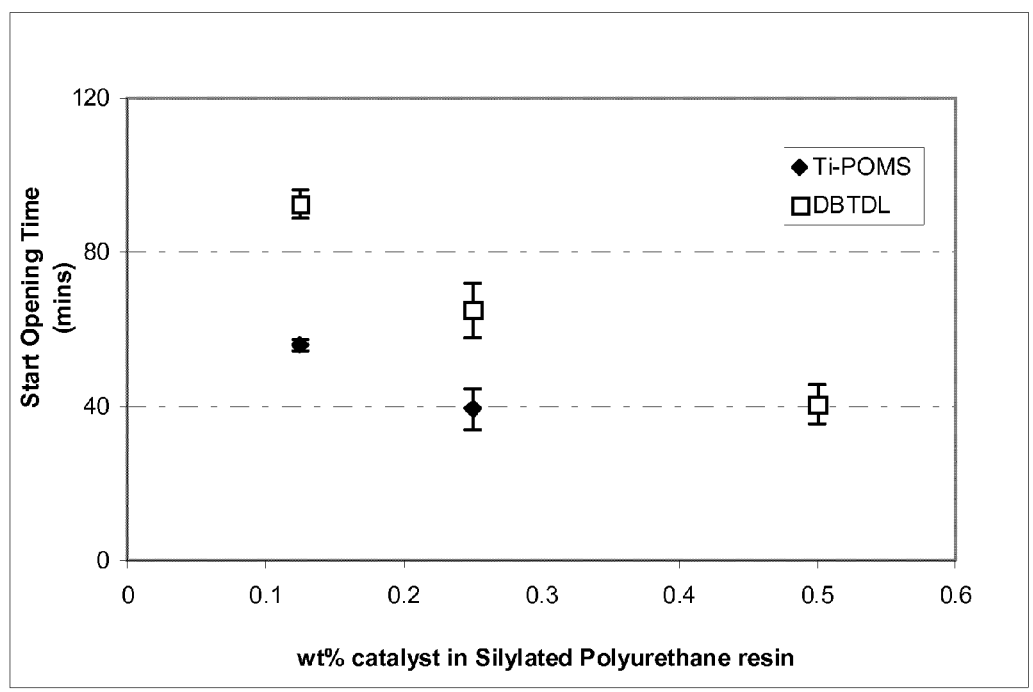

COMPOSITION COMPRISING SILYLATED POLYMERS

This application is the National Phase of International Application PCT/EP2014/056504 filed Apr. 1, 2014 which designated the U.S. and which claims priority to Foreign Application No. 13165285.1 filed Apr. 25, 2013. The noted applications are incorporated herein by reference.

FIELD OF INVENTION

This invention relates to a composition comprising silylated polymers comprising alkoxysilyl and/or silanol moieties, and more specifically silylated polyurethanes and to a process to prepare such compositions.

BACKGROUND OF THE INVENTION

Many commercial compositions containing moisture curable silylated polymers are known, and have many commercial applications. For example, silylated polyurethane resins are useful as coatings, adhesives, sealants and industrial elastomeric goods.

The curing of these moisture curable silylated polymer compositions requires the use of curing agents. Organotin compounds (e.g. dibutyl tin dilaurate (DBTDL)) have proved to be the most effective compounds to catalyze the curing process which comprises hydrolysis/condensation reactions of the silylated polymers.

However, these organotin compounds are classified as toxic, and therefore, their use should be avoided or limited in articles for human or animal use.

Therefore, there is a need for a tin-free curing agent, which can replace organotin compounds, and which displays at least similar performance levels compared to these compounds.

In the past problems related to the toxicity of tin have been addressed by limiting the quantities of tin in the final polymer, merely reducing the tin level below 0.1 wt %. Alternatively, other organometallic curing agents based on e.g. Zr, Bi, Ti etc. have been screened. Also, pH driven cure processes using amines and/or acids as curing agents have been used for the silylated polymers.

However, these alternatives have not proven to be satisfactory, either the tin levels are still too high from a toxicity point of view or the alternative curing agents do not perform at the same level as tin. Furthermore, some alternative curing agents are known to result in strong discoloring of the polymer, which is not a desired feature.

SUMMARY OF THE INVENTION

According to a first aspect of the present invention, a composition is provided, comprising at least one silylated polymer and at least one tin-free polyhedral oligomeric metallo silsesquioxane.

According to a second aspect, the present invention also encompasses a process of curing a composition according to the first aspect of the invention, said process comprising the step of: contacting at least one silylated polymer with at least one tin-free polyhedral oligomeric metallo silsesquioxane; thereby obtaining a cured composition.

It has been now surprisingly found that the use of tin-free polyhedral oligomeric metallo silsesquioxane compounds (POMS) as a curing agent has demonstrated to increase the hydrolysis and condensation rate of organofunctional alkoxysilyl and/or silanol groups. Specifically, in silylated polymer systems, and more specifically in silylated polyurethane systems these curing agents have displayed an activity twice as high compared to organotin compounds in surface cure experiments.

In the context of the present invention tin-free means a tin level of below 0.001 wt %.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. The reference figures quoted below refer to the attached drawings.

BRIEF DESCRIPTION OF THE DRAWINGS

FIG. 1 represents a graph plotting Start Opening Times for catalysed silylated polyurethane resins as a function of wt % of catalyst.

DETAILED DESCRIPTION OF THE INVENTION

Before the present compositions and formulations of the invention are described, it is to be understood that this invention is not limited to particular compositions and formulations described, since such compositions and formulations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded.

Where groups may be optionally substituted, such groups may be substituted once or more, and preferably once, twice or thrice. Substituents may be selected from but are not limited to, for example, the group comprising alcohol, carboxylic acid, ester, amino, amido, ketone, ether and halide functional groups; such as for example halogen, hydroxyl, oxo, amido, carboxy, amino, halo$C_{1-6}$alkoxy, and halo$C_{1-6}$alkyl.

As used herein the terms such as "substituted or unsubstituted $C_{1-20}$alkyl", "substituted or unsubstituted $C_{3-6}$cycloalkyl", "substituted or unsubstituted $C_{2-20}$alkenyl", or "substituted or unsubstituted $C_{6-10}$aryl" are synonymous to "$C_{1-20}$alkyl, $C_{3-6}$cycloalkyl, $C_{2-20}$alkenyl, $C_{6-10}$aryl, each being optionally substituted with . . . ".

As used herein the terms such as "alkyl, alkenyl, aryl, or cycloalkyl, each being optionally substituted with . . . " or "alkyl, alkenyl, aryl, or cycloalkyl, optionally substituted with . . . " encompasses "alkyl optionally substituted with . . . ", "alkenyl optionally substituted with . . . ", "aryl optionally substituted with . . . " and "cycloalkyl optionally substituted with . . . ".

The term "$C_{1-24}$alkyl", as a group or part of a group, refers to a hydrocarbyl radical of Formula $C_nF_{2n+1}$ wherein n is a number ranging from 1 to 24. Preferably, the alkyl group comprises from 1 to 20 carbon atoms, for example 1 to 10 carbon atoms, for example 1 to 6 carbon atoms, for example 1 to 4 carbon atoms. Alkyl groups may be linear or branched and may be substituted as indicated herein. When a subscript is used herein following a carbon atom, the subscript refers to the number of carbon atoms that the named group may contain. Thus, for example, $C_{1-20}$alkyl means an alkyl of 1 to 20 carbon atoms. Thus, for example, $C_{1-6}$alkyl means an alkyl of 1 to 6 carbon atoms. Examples of alkyl groups are methyl, ethyl, propyl, isopropyl (i-propyl), butyl, isobutyl (i-butyl), sec-butyl, tert-butyl, pentyl and its chain isomers, hexyl and its chain isomers. When the term "alkyl" is used as a suffix following another term, as in "hydroxyalkyl", this is intended to refer to an alkyl group, as defined above, being substituted with one or two (preferably one) substituent(s) selected from the other, specifically-named group, also as defined herein. The term "hydroxyalkyl" therefore refers to a —$R^a$—OH group wherein $R^a$ is alkylene as defined herein.

The term "$C_{3-24}$cycloalkyl" as a group or part of a group, refers to a cyclic alkyl group, that is to say, a monovalent, saturated, or unsaturated hydrocarbyl group having 1 or 2 cyclic structure. Cycloalkyl includes all saturated hydrocarbon groups containing 1 to 2 rings, including monocyclic or bicyclic groups. Cycloalkyl groups may comprise 3 or more carbon atoms in the ring and generally, according to this invention comprise from 3 to 24, preferably 3 to 6 carbon atoms. Examples of "$C_{3-6}$cycloalkyl" groups include but are not limited to cyclopropyl, cyclobutyl, cyclopentyl, cyclohexyl.

The term "$C_{2-20}$alkenyl" as a group or part of a group, refers to an unsaturated hydrocarbyl group, which may be linear, or branched, comprising one or more carbon-carbon double bonds. Preferred alkenyl groups thus comprise between 2 and 20 carbon atoms, for example between 2 and 10 carbon atoms, for example between 2 and 6 carbon atoms. Non-limiting examples of $C_{2-20}$alkenyl groups include ethenyl, 2-propenyl, 2-butenyl, 3-butenyl, 2-pentenyl and its chain isomers, 2-hexenyl and its chain isomers, 2,4-pentadienyl and the like.

The term "$C_{1-12}$alkylene", as a group or part of a group, refers to $C_{1-12}$alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—CH($CH_3$)—), 1-methyl-ethylene (—CH($CH_3$)—$CH_2$—), n-propylene (—$CH_2$—$CH_2$—$CH_2$—), 2-methylpropylene (—$CH_2$—CH($CH_3$)—$CH_2$—), 3-methylpropylene (—$CH_2$—$CH_2$—CH($CH_3$)—), n-butylene (—$CH_2$—$CH_2$—$CH_2$—$CH_2$—), 2-methylbutylene (—$CH_2$—CH($CH_3$)—$CH_2$—$CH_2$—), 4-methylbutylene (—$CH_2$—$CH_2$—$CH_2$—CH($CH_3$)—).

The term "aryl", as a group or part of a group, refers to a polyunsaturated, aromatic hydrocarbyl group having a single ring (i.e. phenyl) or multiple aromatic rings fused together (e.g. naphthyl) or linked covalently, typically containing 6 to 24 carbon atoms; preferably 6 to 10 carbon atoms, wherein at least one ring is aromatic. The aromatic ring may optionally include one to two additional rings fused thereto. Aryl is also intended to include the partially hydrogenated derivatives of the carbocyclic systems enumerated herein. Non-limiting examples of aryl comprise phenyl, biphenylyl, biphenylenyl, 5- or 6-tetralinyl, 1-, 2-, 3-, 4-, 5-, 6-, 7- or 8-azulenyl, naphthalen-1- or -2-yl, 4-, 5-, 6 or 7-indenyl, 1- 2-, 3-, 4- or 5-acenaphtylenyl, 3-, 4- or 5-acenaphtenyl, 1-, 2-, 3-, 4- or 10-phenanthryl, 1- or 2-pentalenyl, 4- or 5-indanyl, 5-, 6-, 7- or 8-tetrahydronaphthyl, 1,2,3,4-tetrahydronaphthyl, 1,4-dihydronaphthyl, 1-, 2-, 3-, 4- or 5-pyrenyl. "$C_{6-10}$aryl" refers to an aryl containing 6 to 10 atoms; wherein at least one ring is aromatic. Examples of $C_{6-10}$aryl include phenyl, naphthyl, indanyl, or 1,2,3,4-tetrahydro-naphthyl.

The term "alkoxy" or "alkyloxy" as a group or part of a group, refers to a radical having the Formula —$OR^b$ wherein $R^b$ is alkyl as defined herein. Preferably, alkoxy is $C_{1-6}$ alkoxy, more preferably alkoxy is $C_{1-4}$ alkoxy.

The term "heteroaryl" as a group or part of a group, refers but is not limited to 5 to 12 carbon-atom aromatic rings or ring systems containing 1 to 2 rings which are fused together or linked covalently, typically containing 5 to 6 atoms; at least one of which is aromatic in which one or more carbon atoms in one or more of these rings can be replaced by oxygen, nitrogen or sulfur atoms where the nitrogen and sulfur heteroatoms may optionally be oxidized and the nitrogen heteroatoms may optionally be quaternized. Such rings may be fused to an aryl, cycloalkyl, heteroaryl or heterocyclyl ring. Non-limiting examples of such heteroaryl include: pyrrolyl, furanyl, thiophenyl, pyrazolyl, imidazolyl, oxazolyl, isoxazolyl, thiazolyl, isothiazolyl, triazolyl, oxadiazolyl, thiadiazolyl, tetrazolyl, oxatriazolyl, thiatriazolyl, pyridinyl, pyrimidyl, pyrazinyl, pyridazinyl, oxazinyl, dioxinyl, thiazinyl, triazinyl, imidazo[2,1-b][1,3] thiazolyl, thieno[3,2-b]furanyl, thieno[3,2-b]thiophenyl, thieno[2,3-d][1,3]thiazolyl, thieno[2,3-d]imidazolyl, tetrazolo[1,5-a]pyridinyl, indolyl, indolizinyl, isoindolyl, benzofuranyl, isobenzofuranyl, benzothiophenyl, isobenzothiophenyl, indazolyl, benzimidazolyl, 1,3-benzoxazolyl, 1,2-benzisoxazolyl, 2,1-benzisoxazolyl, 1,3-benzothiazolyl, 1,2-benzoisothiazolyl, 2,1-benzoisothiazolyl, benzotriazolyl, 1,2,3-benzoxadiazolyl, 2,1,3-benzoxadiazolyl, 1,2,3-benzothiadiazolyl, 2,1,3-benzothiadiazolyl, thienopyridinyl, purinyl, imidazo[1,2-a]pyridinyl, 6-oxo-pyridazin-1(6H)-yl, 2-oxopyridin-1(2H)-yl, 6-oxo-pyridazin-1(6H)-yl, 2-oxopyridin-1(2H)-yl, 1,3-benzodioxolyl, quinolinyl, isoquinolinyl, cinnolinyl, quinazolinyl, quinoxalinyl.

The term metalloid as used herein covers the following elements: boron (B), carbon (C), aluminum (Al), silicon (Si), germanium (Ge), arsenic (As), selenium (Se), antimony (Sb), tellurium (Te), astatine (At).

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The present invention relates to a composition comprising a silylated polymer and a tin-free polyhedral oligomeric metallo silsesquioxane (POMS).

In some embodiments, the polyhedral oligomeric metallo silsesquioxane is a compound of formula (I) wherein

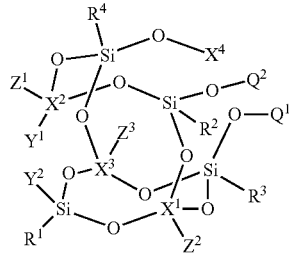

(I)

$X^1$, $X^2$, and $X^3$ are each independently selected from Si or $M^1$, wherein $M^1$ is selected from the group consisting of s and p block metals with the exclusion of tin and d and f block transition metals, lanthanide and actinide metals, and metalloids; preferably $M^1$ is a metal selected from the group consisting of Ti, Zr and Hf;

$Z^1$, $Z^2$ and $Z^3$ are each independently selected from $L^2$, $R^5$, $R^6$, or $R^7$; wherein $L^2$ is selected from —OH or —O—$C_{1-10}$alkyl, for example $L^2$ can be selected from —OH or —O—$C_{1-8}$alkyl, for example $L^2$ can be selected from —OH or —O—$C_{1-6}$alkyl, preferably $L^2$ can be selected from the group comprising —OH, —O-methyl, —O-ethyl, —O-propyl, —O-butyl, —O-octyl, —O-i-propyl, —O-i-butyl;

$R^1$, $R^2$, $R^3$, $R^4$, $R^5$, $R^6$, and $R^7$ are each independently selected from substituted or unsubstituted $C_{1-20}$alkyl, substituted or unsubstituted $C_{3-6}$cycloalkyl, substituted or unsubstituted $C_{2-20}$alkenyl, or substituted or unsubstituted $C_{6-10}$aryl;

$Y^1$ and $Y^2$ are each independently —O-$M^2$-$L^3$; or $Y^1$ and $Y^2$ are linked together and form —O-$M^2(L^3)$-O— or —O—; wherein $L^3$ is selected from —OH or —O—$C_{1-10}$alkyl, for example $L^3$ can be selected from —OH or —O—$C_{1-8}$alkyl, for example $L^3$ can be selected from —OH or —O—$C_{1-6}$alkyl, preferably $L^3$ can be selected from the group comprising —OH, —O-methyl, —O-ethyl, —O-propyl, —O-butyl, —O-octyl, —O-i-propyl, —O-i-butyl; and $M^2$ is selected from the group consisting of s and p block metals with the exclusion of tin and d and f block transition metals, lanthanide and actinide metals, and metalloids; preferably $M^2$ is selected from the group consisting of Ti, Zr and Hf; and $X^4$ is -$M^3L^1$, or $M^3$, and $Q^1$ and $Q^2$ are each a single bond linked to $M^3$; wherein $L^1$ is selected from OH or —O—$C_{1-10}$alkyl, for example $L^1$ can be selected from —OH or —O—$C_{1-8}$alkyl, for example $L^1$ can be selected from —OH or —O—$C_{1-6}$alkyl, and $M^3$ is selected from the group consisting of s and p block metals with the exclusion of tin and d and f block transition metals, lanthanide and actinide metals, and metalloids; preferably $M^3$ is selected from the group consisting of Ti, Zr and Hf;

Or $X^4$ is -$M^3L^1$; and $Q^2$ is a single bond linked to $M^3$; and $Q^1$ is -$M^4L^4$ or —Si$R^{38}$; wherein $M^4$ is selected from the group consisting of s and p block metals with the exclusion of tin and d and f block transition metals, lanthanide and actinide metals, and metalloids; preferably $M^4$ is selected from the group consisting of Ti, Zr and Hf; wherein $L^4$ is selected from —OH or —O—$C_{1-10}$alkyl, for example $L^4$ can be selected from —OH or —O—$C_{1-8}$alkyl, for example $L^4$ can be selected from —OH or —O—$C_{1-6}$alkyl, preferably $L^4$ can be selected from the group comprising —OH, O-methyl, —O-ethyl, —O-propyl, —O-butyl, —O-octyl, —O-i-propyl, O-i-butyl; and $R^{38}$ is selected from substituted or unsubstituted $C_{1-20}$alkyl, substituted or unsubstituted $C_{3-6}$cycloalkyl, substituted or unsubstituted $C_{2-20}$alkenyl, or substituted or unsubstituted $C_{6-10}$aryl;

Or $X^4$, $Q^1$ and $Q^2$ are each independently -$M^3L^1$;

or $X^4$ is —Si($R^{38}$)—O-$M^3L^1$; $Q^2$ is a single bond linked to the Si of $X^4$; and $Q^1$ is -$M^4L^4$;

or $X^4$ is —Si($R^{38}$)—O-$M^3L^1$; $Q^2$ is a single bond linked to the Si of $X^4$; and $Q^1$ is a single bond linked to the $M^3$ of $X^4$.

In some embodiments, $M^1$, and $M^4$ are each independently a metal providing a 6-coordinated metal center, wherein the metal can be selected from the group consisting of s and p block metals with the exclusion of tin and d and f block transition metals, lanthanide and actinide metals. Preferably $M^1$, $M^2$, $M^3$, and $M^4$ are each independently selected from the group consisting of Ti, Zr and Hf. For example $M^1$, $M^2$, $M^3$, and $M^4$ can be each independently Ti.

In some embodiments, $L^1$, $L^2$, $L^3$, $L^4$ are ligands each independently selected from —OH or —O—$C_{1-10}$alkyl; for example $L^1$, $L^2$, $L^3$, $L^4$ are each independently —OH, or —O—$C_{1-8}$alkyl, preferably $L^1$, $L^2$, $L^3$, $L^4$ are each independently —OH, or —O—$C_{1-6}$alkyl; for example $L^1$, $L^2$, $L^3$, $L^4$ are each independently selected from the group consisting of —OH, —O-methyl, —O-ethyl, —O-propyl, —O-butyl, —O-octyl, —O-i-propyl, —O-i-butyl. Each ligand can be independently selected from the group listed above. In a preferred embodiment the ligands are identical.

In some embodiments, $R^1$, $R^2$, $R^3$, $R^4$, $R^5$, $R^6$, $R^7$ and $R^{38}$ can be each independently selected from substituted or unsubstituted, linear or branched hydrocarbon groups having from 1 to 20 carbon atoms. For example, $R^1$, $R^2$, $R^3$, $R^4$, $R^5$, $R^6$, $R^7$ and $R^{38}$ are each independently selected from substituted or unsubstituted $C_{1-20}$alkyl, substituted or unsubstituted $C_{3-6}$cycloalkyl, substituted or unsubstituted $C_{2-20}$alkenyl, or substituted or unsubstituted $C_{6-10}$aryl; for example $R^1$, $R^2$, $R^3$, $R^4$, $R^5$, $R^6$, $R^7$ and $R^{38}$ can be each independently a group selected from $C_{1-20}$alkyl, $C_{3-6}$cycloalkyl, $C_{2-20}$alkenyl, $C_{6-10}$aryl, each group being optionally substituted by one or more substituents selected from the group comprising alcohol, ester, amino, ketone, ether and halide functional groups. Examples of suitable alkyl and cycloalkyl groups for $R^1$, $R^2$, $R^3$, $R^4$, $R^5$, $R^6$, $R^7$ and $R^{38}$ groups include but are not limited to methyl, ethyl, propyl, isopropyl, butyl, isobutyl, hexyl, heptyl, octyl and cyclohexyl groups. $R^1$, $R^2$, $R^3$, $R^4$, $R^5$, $R^6$, $R^7$ and $R^{38}$ groups may also include alkenyl groups such as vinyl, allyl, hexenyl, heptenyl and octenyl groups and aryl groups such as phenyl groups.

In some embodiments, the tin-free polyhedral oligomeric metallo silsesquioxane is a compound of formula (I), wherein $X^1$, $X^2$, $X^3$ are each independently Si;
$X^4$ is -$M^3L^1$; and $Q^1$ and $Q^2$ are each a single bond linked to $M^3$;
$Z^1$, $Z^2$ and $Z^3$ are each independently $C_{1-6}$alkyl;
$R^1$, $R^2$, $R^3$ and $R^4$ are each independently substituted or unsubstituted $C_{1-20}$ alkyl, for example $C_{1-10}$ alkyl, preferably $C_{1-6}$alkyl;
$Y^1$ and $Y^2$ are linked together and form —O—.

In some embodiments, the tin-free polyhedral oligomeric metallo silsesquioxane is a compound of formula (II), wherein

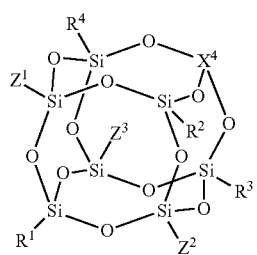

(II)

$X^4$, $R^1$, $R^2$, $R^3$, $R^4$, $Z^1$, $Z^2$, and $Z^3$ have the same meaning as that defined herein above.

In some preferred embodiments, the tin-free polyhedral oligomeric metallo silsesquioxane suitable for use in the present composition is a compound of formula (II), wherein, $Z^1$, $Z^2$, $Z^3$ are each i-butyl; $R^1$, $R^2$, $R^3$, $R^4$ are each i-butyl; $X^4$ is -$M^3L^1$; $M^3$ is Ti; and $L^1$ is O-i-propyl.

In some embodiments, the tin-free polyhedral oligomeric metallo silsesquioxane is a compound of formula (III), wherein

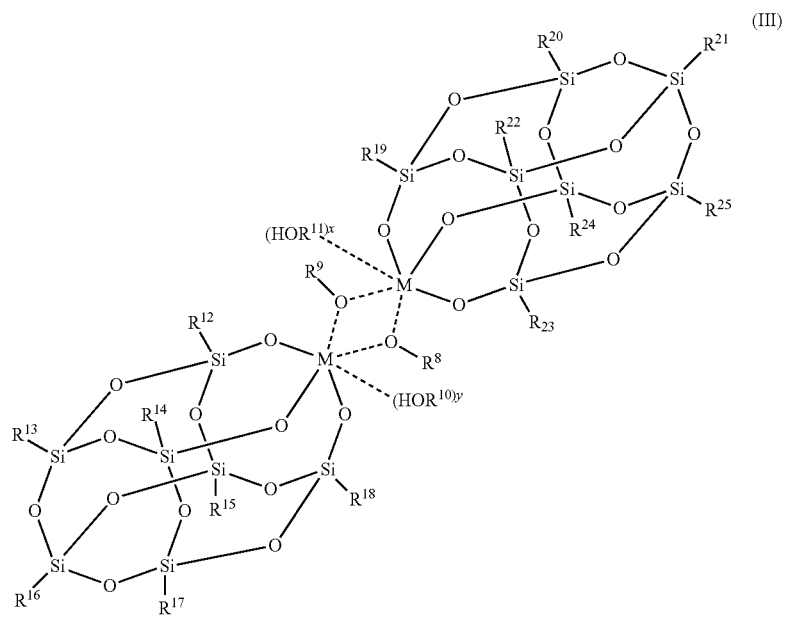

(III)

M is selected from the group consisting of s and p block metals with the exclusion of tin and d and f block transition metals, lanthanide and actinide metals, and metalloids; preferably M is a metal selected from the group comprising of Ti, Zr and Hf; preferably M is Ti;
x is an integer selected from 0 or 1;
y is an integer selected from 0 or 1;
$R^8$ and $R^9$ are each independently $C_{1-20}$alkyl; in some embodiments $R^8$ and $R^9$ are preferably identical; in some embodiments each of said $R^8$ or $R^9$ is $C_{1-10}$alkyl, for example $C_{1-6}$alkyl; for example an i- or n-butyl group or an i- or n-propyl group;
$R^{10}$ and $R^{11}$ are each independently $C_{1-20}$alkyl; in some embodiments $R^{10}$ and $R^{11}$ are preferably identical; in some embodiments each of said $R^{10}$ or $R^{11}$ is $C_{1-6}$alkyl; for example an i- or n-butyl group or an i- or n-propyl group;
$R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ can be each independently selected from substituted or unsubstituted, cyclic, linear or branched hydrocarbon groups having from 1 to 20 carbon atoms. For example, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, and $R^{25}$ can be each independently selected from substituted or unsubstituted $C_{1-20}$alkyl, substituted or unsubstituted $C_{3-6}$cycloalkyl, substituted or unsubstituted $C_{2-20}$alkenyl, or substituted or unsubstituted $C_{6-10}$aryl. In some embodiments, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ can be each independently a group selected from $C_{1-20}$alkyl, $C_{3-6}$cycloalkyl, $C_{2-20}$alkenyl, $C_{6-10}$aryl, each group being optionally substituted by one or more substituents selected from alcohol, ester, amino, ketone, ether and halide functional groups as substituents. Examples of alkyl and cycloalkyl groups for $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ groups include but are not limited to methyl, ethyl, propyl, isopropyl, butyl, isobutyl, hexyl, heptyl, octyl and cyclohexyl groups. $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ groups may also include alkenyl groups such as vinyl, allyl, hexenyl, heptenyl and octenyl groups and aryl groups such as phenyl groups. Most preferably $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ is each independently selected from i- or n-butyl group or i- or n-propyl group.

Such group, coupled to a Si-atom in the POMS (polyhedral oligomeric metallo silsesquioxane) structure, is referred to herein as a ligand. $R^{12}$ to $R^{25}$ may all be different, or some of the ligands may be identical to each other, whereas not all these ligands are identical. Most preferably $R^{12}$ to $R^{25}$ are identical.

In some preferred embodiments, the tin-free polyhedral oligomeric metallo silsesquioxane used in the composition according to the first aspect of the present invention, is a compound of formula (III). In some preferred embodiments, the tin-free polyhedral oligomeric metallo silsesquioxane suitable for use in the present composition is a compound of formula (III), wherein x and y are each 0; M is Ti; $R^8$, $R^9$, $R^{10}$ and $R^{11}$ are each independently $C_{1-6}$alkyl; $R^{12}$ to $R^{25}$ are each independently $C_{1-6}$alkyl.

For example a compound of formula (III), comprising two Ti metals, and wherein $R^8$, $R^9$, $R^{10}$ and $R^{11}$ are i-butyl groups.

In some preferred embodiments, the tin-free polyhedral oligomeric metallo silsesquioxane suitable for use in the present composition is a compound of formula (III), wherein x and y are each 0; M is Ti; $R^8$ and $R^9$ are each i-propyl; $R^{12}$ to $R^{25}$ are each i-butyl.

In some preferred embodiments, the tin-free polyhedral oligomeric metallo silsesquioxane suitable for use in the present composition is a compound of formula (III), wherein x and y are each 0; M is Ti; $R^8$ and $R^9$ are each i-propyl; $R^{12}$ to $R^{25}$ are each i-octyl.

In some embodiments, the polyhedral oligomeric metallo silsesquioxane is a compound of formula (IV), (V), (VI), (VII), or (VIII) wherein

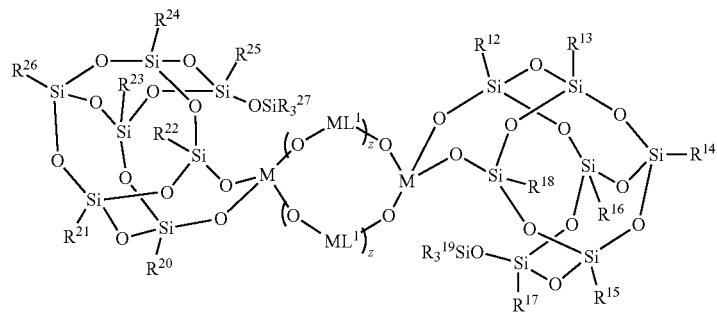

(IV)

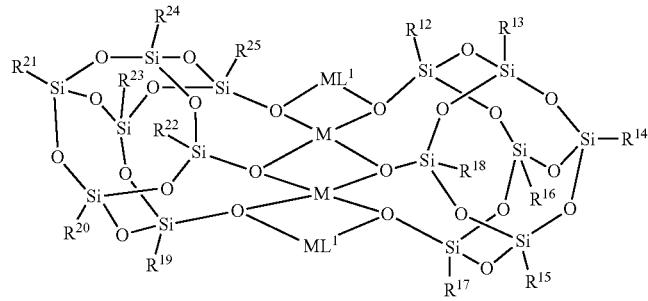

(V)

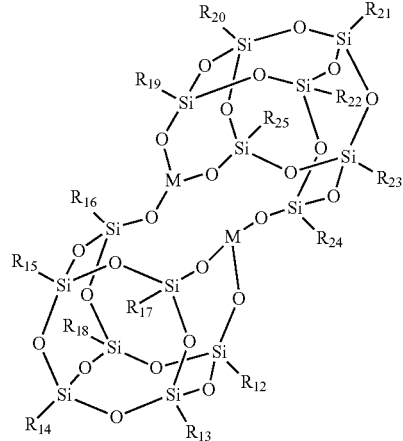

(VI)

-continued

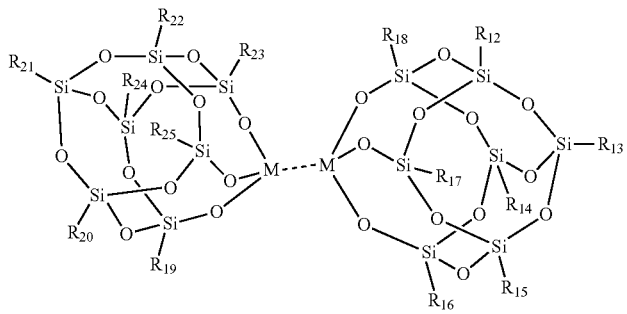

(VII)

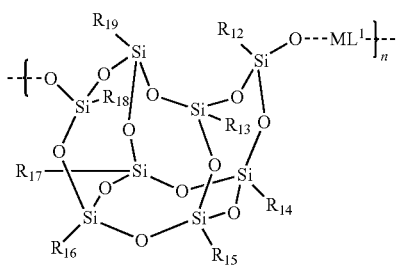

(VIII)

M is selected from the group consisting of s and p block metals with the exclusion of tin (excluding Sn) and d and f block transition metals, lanthanide and actinide metals, and metalloids; preferably M is a metal selected from the group consisting of Ti, Zr and Hf; preferably M is Ti;

$L^1$ is selected from OH or —O—$C_{1-10}$alkyl, for example $L^1$ can be selected from —OH or —O—$C_{1-8}$alkyl, for example $L^1$ can be selected from —OH or —O—$C_{1-6}$alkyl, z is an integer selected from 0, 1 or 2;

n is an integer selected from the range 1 to 100;

$R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ can be each independently selected from substituted or unsubstituted, cyclic, linear or branched hydrocarbon groups having from 1 to 20 carbon atoms. For example, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$ and $R^{27}$ can be each independently selected from substituted or unsubstituted $C_{1-20}$alkyl, substituted or unsubstituted $C_{3-6}$cycloalkyl, substituted or unsubstituted $C_{2-20}$alkenyl, or substituted or unsubstituted $C_{6-10}$aryl. In some embodiments, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ can be each independently a group selected from $C_{1-20}$alkyl, $C_{3-6}$cycloalkyl, $C_{2-20}$alkenyl, $C_{6-10}$aryl, each group being optionally substituted by one or more substituents selected from alcohol, ester, amino, ketone, ether and halide functional groups as substituents. Examples of alkyl and cycloalkyl groups for $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ groups include but are not limited to methyl, ethyl, propyl, isopropyl, butyl, isobutyl, hexyl, heptyl, octyl and cyclohexyl groups. $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ groups may also include alkenyl groups such as vinyl, allyl, hexenyl, heptenyl and octenyl groups and aryl groups such as phenyl groups. Most preferably $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ are each independently selected from the group of i- or n-butyl group or i- or n-propyl group.

Such group, coupled to a Si-atom in the POMS (polyhedral oligomeric metallo silsesquioxane) structure, is referred to herein as a ligand. $R^{12}$ to $R^{27}$ may all be different, or some of the ligands may be identical to each other, whereas not all these ligands are identical. Most preferably $R^{12}$ to $R^{27}$ are identical.

In some embodiments, the amount of tin-free polyhedral oligomeric metallo silsesquioxane (POMS) is in a range of 0.001 wt % to 5 wt % with a preferred loading of 0.01 wt % to 2 wt % and more preferred between 0.1 wt % to 2 wt % based on the total weight of the composition.

It has been surprisingly found that significantly lower levels of said tin-free polyhedral oligomeric metallo silsesquioxane are required to achieve similar curing performance compared to tin containing curing agents. Some experiments have shown that for example Ti is required at 8 times lower levels compared to the Sn (loading comparison is based on the weight of the metal). For example less than 0.23 wt % Ti-POMS in silylated polyurethane yielded similar cure characteristics compared to 0.47 wt % dibutyltin dilaurate (DBTDL) in the same silylated polyurethane. Same expressed in metal content, 0.012 wt % of Ti yielded a similar cure profile compared to 0.087 wt % of Sn.

Suitable polymers for the use in the present invention are silylated polymers. Non limiting examples of silylated polymer can be selected from the group comprising silylated polyurethanes, silylated silicones, silylated polyethers (MS polymers), silylated polycarbonates, silylated polyolefins, silylated polyesters, silylated polyacrylates, silylated polyvinyl acetates; and mixtures thereof and copolymers thereof.

In some preferred embodiment, said silylated polymer refers to a polymer that comprises one or more alkoxysilyl and/or silanol moieties. Alkoxysilyl and/or silanol containing polymers can be silane terminated, silane grafted or any polymer in which the silane is incorporated into the backbone. Preferably, silylated polymers are polymers comprising alkoxysilyl and/or silanol moieties.

Suitable polymers comprising alkoxysilyl and/or silanol moieties for the use in the present invention are selected from the group comprising polyurethanes comprising alkoxysilyl and/or silanol moieties; silicones comprising alkoxysilyl and/or silanol moieties; polyethers comprising alkoxysilyl and/or silanol moieties; polycarbonates comprising alkoxysilyl and/or silanol moieties; polyolefins comprising alkoxysilyl and/or silanol moieties; polyesters comprising alkoxysilyl and/or silanol moieties; polyacrylates comprising alkoxysilyl and/or silanol moieties; polyvinyl acetates comprising alkoxysilyl and/or silanol moieties; and mixtures thereof and copolymers thereof.

Silylation of the suitable polymers for use in the present invention can be made in any possible way known to person skilled in the art by using alkoxysilane and/or silanol compounds.

In an embodiment, a suitable silylated polymer is a silylated polyurethane, for example a polyurethane comprising alkoxysilyl and/or silanol moieties.

Silylated polyurethanes are known and commercially available. Non-limiting examples of commercially available silylated polyurethanes include SPUR materials from Momentive and/or Polymer ST from Evonik. In some embodiments, the silylated polyurethanes can be prepared by contacting at least one isocyanate with one or more compounds containing isocyanate-reactive hydrogen atoms and one or more alkoxysilyl and/or silanol compounds, in any possible order of addition.

Non-limiting examples of processes for preparing silylated polyurethane are described in WO 2011/161011 hereby incorporated by reference. For example a silylated polyurethane can be prepared by contacting a polyisocyanate with an isocyanate reactive compound (such as a polyol, such as a polyalkyleneglycol), and subsequently silylating the mixture with an alkoxysilane.

Suitable isocyanates for use in the preparation of silylated polyurethane may be aromatic, cycloaliphatic, heterocyclic, araliphatic or aliphatic organic polyisocyanates. Suitable isocyanates include also polyisocyanates.

Suitable polyisocyanates for use in preparing the silylated polyurethane components comprise polyisocyanates of the type $R^a$—$(NCO)_x$ with x at least 1 and $R^a$ being an aromatic or aliphatic group, such as diphenylmethane, toluene, dicyclohexylmethane, hexamethylene, or a similar polyisocyanate.

Non-limiting examples of suitable polyisocyanates that can be used in the present invention can be any organic polyisocyanate compound or mixture of organic polyisocyanate compounds, preferably wherein said compounds have at least two isocyanate groups. Non-limiting examples of organic polyisocyanates include diisocyanates, particularly aromatic diisocyanates, and isocyanates of higher functionality. Non-limiting examples of organic polyisocyanates which may be used in the formulation of the present invention include aliphatic isocyanates such as hexamethylene diisocyanate; and aromatic isocyanates such as diphenylmethane diisocyanate (MDI) in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), m- and p-phenylene diisocyanate, tolylene-2,4- and tolylene-2,6-diisocyanate (also known as toluene diisocyanate, and referred to as TDI, such as 2,4-TDI and 2,6-TDI) in any suitable isomer mixture, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyl-diphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane (e.g. 4,4'-diisocyanatodicyclohexylmethane (H12MDI)), triisocyanates such as 2,4,6-triisocyanatotoluene and 2,4,4-triisocyanatodiphenylether, isophorone diisocyanate (IPDI), butylene diisocyanate, trimethylhexamethylene diisocyanate, isocyanatomethyl-1,8-octane diisocyanate, tetramethylxylene diisocyanate (TMXDI), 1,4-cyclohexanediisocyanate (CDI), and tolidine diisocyanate (TODI); any suitable mixture of these polyisocyanates, and any suitable mixture of one or more of these polyisocyanates with MDI in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above, and preferably MDI-based polyisocyanates), with components containing isocyanate-reactive hydrogen atoms and alkoxysilane compound such as amino alkoxysilanes to form polymeric silylated polyisocyanates or so-called silylated prepolymers. Preferably toluene diisocyanates (TDI), diphenylmethane diisocyanate (MDI)-type isocyanates, and prepolymers of these isocyanates are used.

Preferably, the isocyanate comprises a polymeric methylene diphenyl diisocyanate. In a preferred embodiment, the isocyanate has a functionality of at least 1.0, preferably at least 2.0. As used herein, the term "functionality" refers to the average number of isocyanate groups per molecule, averaged over a statistically relevant number of molecules present in the isocyanate.

The polymeric methylene diphenyl diisocyanate can be any mixture of pure MDI (2,4'-, 2,2'- and 4,4'-methylene diphenyl diisocyanate) and higher homologues of formula (I):

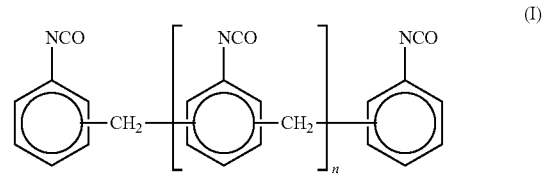

wherein n is an integer which can be from 1 to 10, preferably from 1 to 5.

Prepolymeric polyisocyanates for use in the preparation of the silylated polyurethane can have isocyanate values from 0.5 wt % to 33 wt % by weight of the prepolymer, preferably from 0.5 wt % to 12 wt %, more preferably from 0.5 wt % to 6 wt % and most preferably from 1 wt % to 6 wt %.

Isocyanate reactive compound may be alcohols, e.g. polyols such as glycols or even relatively high molecular weight polyether polyols and polyester polyols, mercaptans, carboxylic acids such as polybasic acids, amines, polyamines, components comprising at least one alcohol group and at least one amine group, such as polyaminepolyols, urea and amides.

In some preferred embodiment, the isocyanate reactive compounds are typically components containing isocyanate-reactive hydrogen atoms including polyols such as glycols; hydroxyl terminated polyester (polyester polyols); a hydroxyl terminated polyether (polyether polyols); a hydroxyl terminated polycarbonate or mixture thereof, with one or more chain extenders, all of which are well known to those skilled in the art.

The hydroxyl terminated polyester (polyester polyols) can be generally a polyester having a number average molecular weight (Mn) of from about 500 to about 10000, desirably from about 700 to about 5000, and preferably from about 700 to about 4000, an acid number generally less than 1.3 and preferably less than 0.8. The molecular weight is determined by assay of the terminal functional groups and is related to the number average molecular weight. The hydroxyl terminated polyester can be produced by (1) an esterification reaction of one or more glycols with one or more dicarboxylic acids or anhydrides or (2) by transesterification reaction, i.e. the reaction of one or more glycols with esters of dicarboxylic acids. Mole ratios generally in excess of more than one mole of glycol to acid are preferred so as to obtain linear chains having a preponderance of terminal hydroxyl groups. Suitable polyesters also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. 1,4-Butanediol is the preferred glycol.

Hydroxyl terminated polyethers are preferably polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, polypropylene glycol) comprising propylene oxide reacted with propylene glycol, poly(tetramethylglycol) (PTMG) comprising water reacted with tetrahydrofuran (THF). Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of glycerol and ethylene oxide or glycerol and propylene oxide. The various polyethers can have a number average molecular weight (Mn), as determined by assay of the terminal functional groups which is an average molecular weight, of from about 500 to about 10000, desirably from about 500 to about 5000, and preferably from about 700 to about 3000.

Hydroxyl terminated polycarbonate can be prepared by reacting a glycol with a carbonate. U.S. Pat. No. 4,131,731 is hereby incorporated by reference for its disclosure of hydroxyl terminated polycarbonates and their preparation. Such polycarbonates are preferably linear and have terminal hydroxyl groups with essential exclusion of other terminal groups. The reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Suitable diols include but are not limited to aliphatic diols containing 4 to 12 carbon atoms such as butanediol-1,4, pentanediol-1,4, neopentyl glycol, hexanediol-1,6, 2,2,4-trimethylhexanedion-1,6, decanediol-1,10, hydrogenated dilinoleylglycol, hydrogenated diolelylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product. Non-limiting examples of suitable carbonates include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate and 2,4-pentylene carbonate. Also suitable are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate and dinaphthylcarbonate.

The isocyanate reactive component can be reacted with the polyisocyanate, along with extender glycol.

Non-limiting examples of suitable extender glycols (i.e., chain extenders) include lower aliphatic or short chain glycols having from about 2 to about 10 carbon atoms and include, for instance, ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl)ether, neopentylglycol, and the like.

Suitable silyl compounds to be used in the preparation of the silylated polyurethane comprise alkoxysilane compounds and/or silanols.

For example a silylated polyurethane for use in the present composition can be prepared by mixing at least one isocyanate as described herein above, with at least one isocyanate reactive compound as described herein above, and at least one alkoxysilane and/or silanol compound.

Suitable silane or silanol compounds for use in preparing silylated polymer, preferably silylated polyurethane, include but are not limited to amino alkoxysilanes, alkoxysilanes, aliphatic hydroxy silanes, cycloaliphatic hydroxy silanes, aromatic hydroxy silanes, epoxy silanes, glycidoxy silanes, isocyanato silanes, anhydride silanes, aldehyde silanes, thio silanes, sulfonate silanes, phosphate silanes, caprolactam silanes, acrylate silanes, succinimide silanes, silsesquinoxane silanes, amide silanes, carbamato silanes, vinyl silanes, alkyl silanes, silanol, silanes carrying at least one hydrogen atom on the silicon and mixtures thereof.

In an embodiment, a suitable alkoxysilane or silanol compound, is an amino-alkoxysilane.

Suitable amino-alkoxysilanes include amino-alkoxysilanes of formula (IX)

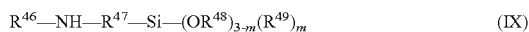

wherein $R^{46}$ is selected from H; optionally substituted $C_{1-24}$alkyl; optionally substituted $C_{3-24}$cycloalkyl; optionally substituted $C_{6-24}$aryl; optionally substituted heteroaryl. Suitable substituents for the alkyl, cycloalkyl or aryl or heteroaryl groups can be selected from, for example, halogen atoms and COOH groups;

$R^{47}$ is a $C_{1-20}$alkylene or $C_{6-20}$arylene;

$R^{48}$ and $R^{49}$ are each independently selected from $C_{1-20}$alkyl or $C_{6-20}$aryl;

m is an integer selected from 0, 1 or 2.

Preferably $R^{47}$ is a $C_{1-12}$alkylene or $C_{6-10}$arylene, for example a $C_{1-10}$alkylene or phenylene, for example a $C_{1-6}$alkylene or phenylene, preferably a $C_{1-4}$alkylene. For example, $R^{47}$ is methylene ($-CH_2-$), or propylene $-(CH_2)_3-$.

Preferably, $R^{48}$ and $R^{49}$, are each independently selected from $C_{1-18}$alkyl or $C_{6-18}$aryl. More preferably, $R^{48}$ and $R^{49}$ are each independently selected from $C_{1-4}$alkyl or $C_{6-10}$aryl. In the most preferred embodiment, $R^{48}$ and $R^{49}$ are identical and are selected from methyl, ethyl, propyl, or butyl. Preferably, m in formula (IX) is 0 or 1.

Non-limiting examples of suitable amino-alkoxysilanes are gamma-N-phenylaminopropyltrimethoxysilane, alpha-N-phenylaminomethyltrimethoxysilane, gamma-N-phenylaminopropyldimethoxymethylsilane, alpha-N-phenylaminomethyl-dimethoxymethylsilane, gamma-N-phenylaminopropyltriethoxysilane, alpha-N-phenylaminomethyltriethoxysilane, gamma-N-phenylaminopropyl-diethoxyethylsilane, alpha-N-phenylaminomethyldiethoxyethylsilane, alpha-N-butylaminomethyltrimethoxysilane, gamma-N-butylaminopropyldimethoxy methylsilane, alpha-N-butylaminomethyldimethoxymethylsilane, gamma-N-butyl aminopropyltriethoxysilane, alpha-N-butylaminomethyltriethoxysilane, gamma-N-butylaminopropyldiethoxyethylsilane, alpha-N-butylaminomethyldiethoxy ethylsilane, gamma-N-methylaminopropyltrimethoxysilane, alpha-N-methylaminomethyltrimethoxysilane, gamma-N-methylaminopropyldimethoxy methylsilane, alpha-N-methylaminomethyldimethoxymethylsilane, gamma-N-methyl aminopropyltriethoxysilane, alpha-N-methylaminomethyltriethoxysilane, gamma-N-methylaminopropyldiethoxyethylsilane, alpha-N-methylaminomethyldiethoxy ethylsilane, gamma-N-cyclohexylaminopropyltrimethoxysilane, alpha-N-cyclohexylaminomethyltrimethoxysilane, gamma-N-cyclohexylaminopropyl-dimethoxymethylsilane, alpha-N-cyclohexylaminomethyldimethoxymethylsilane, gamma-N-cyclohexylaminopropyltriethoxysilane, alpha-N-cyclohexylaminomethyl-triethoxysilane, gamma-N-cyclohexylaminopropyldiethoxyethylsilane, alpha-N-cyclohexylaminomethyldiethoxyethylsilane, gamma-aminopropyltrimethoxysilane, alpha-aminomethyltrimethoxysilane, gamma-aminopropyldimethoxymethylsilane, alpha-aminomethyldimethoxymethylsilane, gamma-aminopropyltriethoxysilane, alpha-aminomethyltriethoxysilane, gamma-aminopropyldiethoxyethylsilane, alpha-aminomethyldiethoxyethylsilane.

In preparing a silylated polyurethane, the polyisocyanate can be pre-reacted with the isocyanate-reactive compound, in the presence of said alkoxysilane compound to form a so-called silylated isocyanate functional prepolymer.

In an embodiment, a suitable silylated polymer is a silylated polyolefin, for example a polyolefin comprising alkoxysilyl and/or silanol moieties.

Silylated polyolefin are known and can be prepared as described herein below. When preparing the silylated polyolefin, the silyl group may be attached to monomers before the polymerization of the olefin; it may be attached to the polymer after polymerization, or it may be attached during some intermediate stage. Additionally, a pendant group may be attached to the monomer or the polymer and then chemically modified to create a suitable silyl group.

Non-limiting examples for preparing silylated polyolefin can be found in EP 1396511 and U.S. Pat. No. 5,994,474, hereby incorporated by reference. For example, the polyolefin can be silane grafted by melt-blending a polyolefin with a free-radical donor and silane molecules that have trialkoxysilane groups attached to ethylenically unsaturated organic portions. Suitable alkoxysilane or silanol compounds are the same as described above for the preparation of silylated polyurethane.

The polyolefins may be any olefin homopolymer or any copolymer of an olefin and one or more comonomers. The polyolefins may be atactic, syndiotactic or isotactic. The olefin can, for example, be ethylene, propylene, 1-butene, 1-pentene, 1-hexene, 4-methyl-1-pentene or 1-octene, but also cycloolefins such as, for example, cyclopentene, cyclohexene, cyclooctene or norbornene. The comonomer is different from the olefin and chosen such that it is suited for copolymerization with the olefin. The comonomer may also be an olefin as defined above. Comonomers may comprise but are not limited to aliphatic $C_2$-$C_{20}$ alpha-olefins. Examples of suitable aliphatic $C_2$-$C_{20}$ alpha-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene.

Examples of olefin copolymers include copolymers of propylene and ethylene, random copolymers of propylene and 1-butene, heterophasic copolymers of propylene and ethylene, ethylene-butene copolymers, ethylene-hexene copolymers, ethylene-octene copolymers, copolymers of ethylene and vinyl acetate (EVA), copolymers of ethylene and vinyl alcohol (EVOH).

The polyolefin, such as polyethylene, can be prepared in the presence of any catalyst known in the art. As used herein, the term "catalyst" refers to a substance that causes a change in the rate of a polymerization reaction. Examples of suitable catalysts are metallocene catalysts, chromium catalysts, and Ziegler-Natta catalysts.

In an embodiment, a suitable silylated polymer is a silylated polyester, for example, a polyester comprising alkoxysilyl and/or silanol moieties.

Silylated polyesters are known. Non-limiting examples of suitable processes for preparing silylated polyesters comprise processes as described in WO 2010/0136511. The process can comprise the step of silylating a polyester with a alkoxysilane and/or silanol compounds. Suitable alkoxysilane or silanol compounds are the same as described above for the preparation of silylated polyurethane.

For example, a silylated polyester can be prepared by contacting a polyester with diisodecylphthalate, and subsequently reacting the mixture with an alkoxysilane such as an isocyanatealkyltrialkoxysilane in the presence of a catalyst.

Suitable alkoxysilane or silanol compounds are the same as described above for the preparation of silylated polyurethane Polyesters that may be used comprise an ester structure —C(=O)O—. Non-limiting examples of suitable polyesters can comprise the following chemical structure as monomer unit [—C(=O)—C$_6$H$_4$—C(=O)O—(CH$_2$—CH$_2$)$_n$—O—], wherein n is an integer from 1 to 10, with preferred values being 1 or 2. Specific examples of such suitable polyesters are polyethylene terephthalate (PET) and polybutylene terephthalate (PBT). Further non-limiting examples of suitable polyesters (and methods for producing them) comprise but are not limited to polyglycolide or polyglycolic acid (PGA) which can be produced by polycondensation of glycolic acid; polylactic acid (PLA) which can be produced by ring-opening polymerization of lactide or directly from lactic acid; poly(3-hydroxybutyrate-co-3-hydroxyvalerate) (PHBV) which can be produced by copolymerization of 3-hydroxybutanoic acid and 3-hydroxypentanoic acid, butyrolactone and valerolactone (oligomeric aluminoxane as a catalyst); polyethylene terephthalate (PET) which can be produced by polycondensation of terephthalic acid with ethylene glycol; polybutylene terephthalate (PBT) which can be produced by polycondensation of terephthalic acid with 1,4-butanediol; polytrimethylene terephthalate (PTT) which can be produced by polycondensation of terephthalic acid with 1,3-propanediol; polyethylene naphthalate (PEN) which can be produced by polycondensation of at least one naphthalene dicarboxylic acid with ethylene glycol; and vectran which can be produced by polycondensation of 4-hydroxybenzoic acid and 6-hydroxynaphthalene-2-carboxylic acid.

In an embodiment, a suitable silylated polymer is a silylated polycarbonate, for example, a polycarbonate comprising alkoxysilyl and/or silanol moieties.

The process can comprise the step of silylating a polycarbonate with a alkoxysilane and/or silanol compounds. Suitable alkoxysilane or silanol compounds are the same as described above for the preparation of silylated polyurethane. Polycarbonates that may be used have a carbonate groups (—O—(C=O)—O—).

In an embodiment, a suitable silylated polymer is a silylated polyether, for example, a polyether comprising alkoxysilyl and/or silanol moieties.

Suitable polyethers are known. Non-limiting example of processes for preparing silylated polyethers can be found in WO 2011075254 hereby incorporated by reference. Suitable alkoxysilane or silanol compounds are the same as described above for the preparation of silylated polyurethane. For example suitable silylated polyether can be prepared by reacting a polyether with an alkoxysilane. For example, a silylated polyether can be obtained by reacting a polyether comprising OH moieties with an isocyanatoalkoxysilane. Suitable polyether comprising OH moieties can be mixtures of different alkoxylation products of polyols. Preferred polyols include those in which polymerized propylene oxide units and/or polymerized ethylene oxide units are present. These units may be arranged in statistical distribution, in the form of polyethylene oxide blocks within the chains and/or terminally. The polyether can have an average nominal functionality of 1-6, more preferably a functionality of 1-4, most preferably a functionality of 1 or 2. The term "average nominal functionality" is used herein to indicate the number average functionality (number of functional groups per molecule) of the polyether on the assumption that this is the number average functionality of the initiator(s) used in their preparation, although in practice it will often be somewhat less because of some terminal unsaturation. As used herein, the term "average" refers to number average unless indicated otherwise. Preferably, the functional groups are alkoxysilyl and/or silanol reactive functional groups (i.e. groups that are reactive with alkoxysilane and/or silanol compounds). Non-limiting examples of alkoxysilyl and/or silanol reactive groups can be selected from the group comprising hydroxyl, amino, and thiol. Non-limiting examples of suitable polyethers include the products obtained by the polymerization of ethylene oxide, including products obtained by the copolymerization of ethylene oxide with another cyclic oxide, for example propylene oxide, for example in the presence of an initiator compound, preferably in the presence of one or more polyfunctional initiators. Suitable initiator compounds contain a plurality of active hydrogen atoms and comprise water and low molecular weight polyethers, for example, ethylene glycol, propylene glycol, diethylene glycol, dipropylene glycol, cyclohexane dimethanol, resorcinol, bisphenol A, glycerol, trimethylolopropane, 1,2,6-hexantriol, pentaerythritol and the like. Mixtures of initiators and/or cyclic oxide may be used. Suitable polyethers include poly(oxyethylene oxypropylene) diols and/or triols obtained by the sequential addition of propylene and ethylene oxides to di- or trifunctional initiators, as fully described in the prior art. Mixtures of said diols and triols are also useful. Preferred are monools and diols. The polyether can be selected from the group comprising polyethylene glycol, polyethylene glycol monomethyl ether, polyethylene glycol monoethyl ether, polyethylene glycol monopropyl ether, polyethylene glycol monoisopropyl ether, polyethylene glycol monobutyl ether, polyethylene glycol monopentyl ether, polyethylene glycol monohexyl ether, polyethylene glycol monophenyl ether, polyethylene glycol monobenzyl ether and mixtures thereof. According to some embodiments, the polyether can have an average molecular weight $M_w$ of from 62 to 40000, for example from 100 to 20000, for example from 200 to 10000, for example from 400 to 6000.

In an embodiment, a suitable silylated polymer is a silylated polyvinylacetate, for example, a polyvinylacetate comprising alkoxysilyl and/or silanol moieties.

The silylated polyvinylacetates can be prepared by silylating a polyvinylacetate using alkoxysilane and/or silanol compounds. Suitable alkoxysilane or silanol compounds are the same as described above for the preparation of silylated polyurethane.

Suitable polyvinylacetates can have a —(C$_4$H$_6$O$_2$)— as monomer unit. Suitable polyvinyl acetate include polyvinyl esters having general formula (X) as a monomer unit:

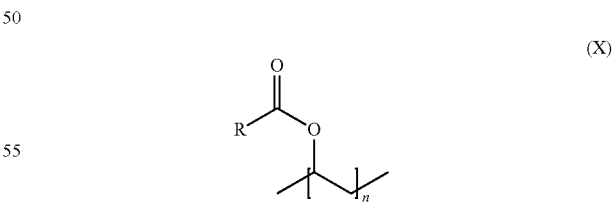

(X)

wherein R is an C$_{1-6}$alkyl or a C$_{6-10}$aryl, such as methyl, ethyl, or phenyl. Polyvinyl acetate can be prepared by polymerization of vinyl acetate monomer (free radical vinyl polymerization of the monomer vinyl acetate). Vinyl acetate can also be polymerized with other monomers to prepare copolymers such as ethylene-vinyl acetate (EVA), vinyl acetate-acrylic acid (VA/AA), polyvinyl chloride acetate (PVCA), and polyvinylpyrrolidone. Both homo- and copolymers of vinylacetate may also be used.

In an embodiment, a suitable silylated polymer is a silylated polyacrylate, for example, a polyacrylate comprising alkoxysilyl and/or silanol moieties.

Silylated polyacrylates are known and can be prepared as described, for example, in DE 102004055450 or U.S. Pat. No. 4,333,867, hereby incorporated by reference. Suitable alkoxysilane or silanol compounds are the same as described above for the preparation of silylated polyurethane. For example, a silylated polyacrylate can be prepared by mixing styrene/ethyl acrylate/acrylic acid copolymer, and reacting the mixture with an alkoxysilane such as a (meth)acryloxyalkylalkoxy silane, in the presence of styrene and acrylic acid.

Polyacrylates can be prepared by polymerizing acrylic monomers. Suitable acrylic monomers include acrylic acid, derivatives of acrylic acid, such as methyl methacrylate in which one vinyl hydrogen and the carboxylic acid hydrogen are both replaced by methyl groups and acrylonitrile in which the carboxylic acid group is replaced by the related nitrile group. Non-limiting examples of suitable acrylate monomers include methacrylates, ethyl acrylate, 2-chloroethyl vinyl ether, 2-ethylhexyl acrylate, hydroxyethyl methacrylate, butyl acrylate, and butyl methacrylate.

In an embodiment, a suitable silylated polymer is a silylated silicone, for example, a silicone comprising alkoxysilyl and/or silanol moieties.

Silylated silicones are known. Non-limiting examples of process for preparing said silylated silicon can be found in WO 2003/018704 and DE 102008054434. Silylated silicone can be prepared by mixing a polysiloxane with a silane compound. For example, suitable silylated silicone can be prepared by contacting α-ω-bisaminopropylpolydimethoxysiloxane, with isophorone diisocyanate and isocyanatopropyltrimethoxysilane. Suitable silicones include polysiloxanes (polymerized siloxanes). Suitable silicones comprise mixed inorganic-organic polymers with the chemical formula $[R_2SiO]_n$, where R is an organic group such as $C_{1-6}$alkyl or $C_{6-10}$aryl such as methyl, ethyl, or phenyl. The organic side groups R can be used to link two or more of these —Si—O— backbones together. By varying the —Si—O— chain lengths, side groups, and crosslinking, silicones can be synthesized with a wide variety of properties and compositions.

The composition of the present invention may further comprise one or more silanes. Suitable silanes can be selected from those described hereinabove for preparing the silylated polymers, such as amino silanes, alkoxysilanes, aliphatic hydroxy silanes, cycloaliphatic hydroxy silanes, aromatic hydroxy silanes, epoxy silanes, glycidoxy silanes, isocyanato silanes, anhydride silanes, aldehyde silanes, thio silanes, sulfonate silanes, phosphate silanes, caprolactam silanes, acrylate silanes, succinimide silanes, silsesquinoxane silanes, amide silanes, carbamato silanes, vinyl silanes, alkyl silanes, silanol, and silanes carrying at least one hydrogen atom on the silicon and mixtures thereof.

The composition of the present invention may comprise one or more additives. In some embodiments, said one or more additives may be selected from the group comprising fillers, adhesion promoters, moisture scavengers, plasticizers, UV stabilizers, thixotropic agents or combinations thereof. In some embodiments, said one or more additives may be a silane.

The additive may be a plasticizer. Preferably, the amount of plasticizer in the composition is limited. In some embodiments, the composition comprises a plasticizer in an amount ranging from 0.0 wt % to at most 50.0 wt % based on the total weight of the silylated polymer.

Suitable plasticizers, for use in the present invention, comprise conventional plasticizers known in the art, such as esters of dibasic or polybasic carboxylic acids with monohydric alcohols.

Other examples of suitable plasticizers may be selected from the group comprising phthalates, such as dioctyl phthalate, diisooctyl phthalate, diisononyl phthalate, dimethyl phthalate, dibutyl phthalate; phosphates, such as tributyl phosphate, triethyl phosphate (TEP), triphenyl phosphate and cresyl diphenyl phosphate; chlorinated biphenyls; aromatic oils; adipates, such as diisononyl adipate and di-(2-ethylhexyl) adipate; and combinations thereof.

Other examples of suitable plasticizers, comprise phosphoric acid esters of branched and unbranched aliphatic, cycloaliphatic and aromatic alcohols. If appropriate, phosphates of halogenated alcohols, for example, trichloroethyl phosphate, can also be employed. It is to be appreciated that mixed esters of the aforementioned alcohols and carboxylic acids can also be employed. So called polymeric plasticizers can also be employed, for purposes of the present invention.

The additive may be an adhesion promoter or a moisture scavenger.

Other additives may be used in the formulation of this invention. Additives such as catalysts, stabilizers, lubricants, colorants, antioxidants, antiozonates, light stabilizers, UV stabilizers and the like may be used in amounts of from 0 to 5 wt % of the composition, preferably from 0 to 2 wt %.

The composition may also comprise non-fire-retardant mineral fillers such as certain oxides, carbonates, silicates, borates, stannates, mixed oxide hydroxides, oxide hydroxide carbonates, hydroxide silicates, or hydroxide borates, or a mixture of these substances. By way of example, use may be made of calcium oxide, aluminum oxide, manganese oxide, tin oxide, boehmite, dihydrotalcite, hydrocalumite, or calcium carbonate. Preferred compounds are silicates and hydroxide silicates. These fillers are usually added in amounts of between 1 to 50% by weight based on the formulation, preferably between 1 and 30% by weight.

Preferably none of said abovementioned additives contains tin so that the composition of the present invention is substantially tin-free, i.e. has a tin content of less then 0.001 wt %.

Although the invention describes the use of tin-free polyhedral oligomeric metallo silsesquioxane for catalysis of silylated polymers, said tin-free polyhedral oligomeric metallo silsesquioxane can be used to catalyze every compounds carrying at least one —Si(OR$^{50}$)$_p$R$^{51}$$_{3-p}$ groups, including low molecular weight materials, which could be silanes; for example, wherein R$^{50}$ can be selected from H; optionally substituted $C_{1-24}$alkyl; optionally substituted $C_{3-24}$cycloalkyl; optionally substituted $C_{6-24}$aryl; optionally substituted heteroaryl; and wherein R$^{51}$ can be selected from H; optionally substituted $C_{1-24}$alkyl; optionally substituted $C_{3-24}$cycloalkyl; optionally substituted $C_{6-24}$aryl; optionally substituted heteroaryl; wherein, p can be 0 or 1. Non-limiting examples of suitable substituents for the alkyl, cycloalkyl, aryl or heteroaryl groups can be selected from, for example, halogen atoms and COOH groups.

The present invention also encompasses the use of at least one tin-free polyhedral oligomeric metallo silsesquioxane, for curing a composition comprising at least one silylated polymer. Suitable silylated polymers have been described above.

Furthermore, the present invention encompasses a process of curing a composition according to the first aspect of the invention comprising the step of: contacting at least one silylated polymer with at least one tin-free polyhedral oligomeric metallo silsesquioxane. The present invention also encompasses a process of curing a composition comprising a silylated polymer, said process comprising the step of contacting the silylated polymer with at least one POMS (as set out above). The present invention also encompasses a process of curing a silylated polymer comprising the step of contacting a silylated polymer with at least one POMS (as set out above), thereby curing said silylated polymer.

In an embodiment, the amount of said tin-free polyhedral oligomeric metallo silsesquioxane is from 0.001 wt % to 5 wt %, based on the total weight of the composition, preferably from 0.01 wt % to 2 wt %, and more preferably 0.1 wt % to 2 wt % based on the total weight of the composition.

In an embodiment, said process comprises the step of contacting at least one neat or formulated silylated polyurethane with at least one tin-free polyhedral oligomeric metallo silsesquioxane; thereby obtaining a cured silylated polyurethane. In some embodiments, said process comprises the steps of: preparing at least one silylated polyurethane forming mixture; and contacting said mixture with one or more POMS as described herein before. In an embodiment, said silylated polyurethane forming mixture, comprises at least one isocyanate, and one or more components containing isocyanate-reactive hydrogen atoms and one or more alkoxysilane or silanol compounds. In an embodiment, the process is performed by first reacting said silylated polyurethane forming mixture thereby obtaining a silylated polyurethane and then contacting one or more POMS with said silylated polyurethane.

All ingredients can be added to the composition in any possible way known by the skilled person, including direct mixing, introduction by solvent, plasticizers, adhesion promoters, moisture scavengers, fillers, thixotropic agents, UV stabilizers etc. and mixtures thereof.

The materials of the invention are highly suitable, for example, in applications for adhesives, sealants, foams, coatings, elastomers, or encapsulants.

In an embodiment, the composition according to the present invention can be used in adhesives, sealants, coatings, elastomers, encapsulants, flexible foams and rigid or semi-rigid foams.

The present invention encompasses a product comprising a composition according to the present invention. The present invention also encompasses a product, obtained by curing a composition according to the first aspect of the invention. Non-limiting examples of suitable products encompassed by the invention comprises adhesives, sealants, coatings, elastomers, encapsulants, flexible foams, rigid or semi-rigid foams.

In some embodiments, the product may be an adhesive. In some embodiments, the product may be a sealant. In other embodiments, the product may be an elastomer. In yet other embodiments, the product may be a foam, such as a flexible foam or a rigid or semi-rigid foam. In yet other embodiments, the product may be an encapsulant. In yet other embodiments, the product may be a coating.

In some embodiments, the composition comprises a silylated polyurethane and the product may be a polyurethane product. In some embodiments, the product may be a polyurethane adhesive. In some embodiments, the product may be a polyurethane sealant. In other embodiments, the product may be a polyurethane elastomer. In yet other embodiments, the product may be a polyurethane foam, such as a flexible foam or a rigid or semi-rigid polyurethane foam. In yet other embodiments, the product may be a polyurethane encapsulant. In yet other embodiments, the product may be a polyurethane coating.

EXAMPLES

Unless otherwise indicated, all parts and all percentages in the following examples, as well as throughout the specification, are parts by weight or percentages by weight respectively.

Silylated polyurethane 1: made from methylenediphenylenediisocyanate (MDI; Suprasec 3050; Huntsman Polyurethanes: a 50/50 mixture of the 2,4- and 4,4-isomers), polypropylene glycol (PPG2000, Daltocel F456, produced by Huntsman) and N-butyl aminopropyl trimethoxysilane (Dynasylan 1189, supplied by Evonik Industries).

Alternatively commercially available silylated polyurethanes such as SPUR materials from Momentive and/or Polymer ST from Evonik can be used as silylated polyurethane.

The isobutyl POMS titanium used in the examples is a polyhedral oligomeric metallo silsesquioxane having general formula I wherein, $X^1=X^2=X^3=Si$;
$Z^1=Z^2=Z^3=$i-butyl;
$R^1=R^2=R^3=R^4=$i-butyl;
$Y^1$ and $Y^2$ are together —O—;
$X^4$ is —Ti—O-i-Propyl; and $Q^1$ and $Q^2$ are each a single bond linked to Ti, hereby referred as "isobutyl POMS titanium isopropoxide".

Surface cure characteristics for all examples below were studied by BK dryer experiments as described below:

A coating (500 μm thickness) was applied on 305×24.5× 2.45 mm³ glass strips. The test samples were placed on a BK dryer recorder under controlled atmosphere of 23° C. and 50% relative humidity. A metal needle in perpendicular contact with the sample was dragged along the glass strip at a fixed speed and curing profiles were recorded. The points SOT, EOT and ES corresponding to characteristic curing steps are reported for all examples below.

SOT=start opening time, corresponding to the moment where a permanent trace is visible EOT=end opening time, corresponding to the end of skin ripping but the surface is still not fully cured ES=end of scratch Example 1 (According to the Present Invention)

A solution of 2.7 wt % of isobutyl POMS titanium isopropoxide in DINP (di-isononyl phthalate) was prepared by dissolving isobutyl POMS titanium isopropoxide in DINP in an ultrasonic bath for 30 min. at room temperature (RT), followed by mixing at 2500 rpm for 6 min. This solution was formulated with silylated polyurethane resin 1. The solution comprises 91.3 wt % silylated polyurethane resin and 8.7 wt % isobutyl POMS titanium isopropoxide solution. The mixture was flushed with nitrogen and mixed at 2500 rpm for 5 min. The final content of isobutyl POMS titanium isopropoxide in the silylated polyurethane resin was 0.23 wt % (0.012 wt % of Ti). Castings of 500 micrometers were made and cure characteristics were studied with a BK dryer recorder.

Start open time: 42 min and the end of scratch time: 110 min.

Example 2 (Comparative Example—Sn Cured Silylated Polyurethane Resin)

A mixture of 5.4 wt % of dibutyl tin dilaurate (DBTDL) with DINP (di-isononyl phtalate) was prepared by shearing the mixture at 2500 rpm for 5 min. This solution was formulated with silylated polyurethane resin. The solution comprises 91.3 wt % silylated polyurethane resin 1 and 8.7 wt % DBTDL solution. The mixture was flushed with nitrogen and mixed at 2500 rpm for 5 min. The final content of DBTDL in the silylated polyurethane resin was 0.47 wt % (0.087 wt % of Sn). Castings of 500 micrometers were made and cure characteristics were studied with a BK dryer recorder.

Start open time: 41 min, end of scratch time: 105 min.

Examples 1 and 2 have demonstrated that similar cure characteristics were obtained with half the amount of isobutyl POMS titanium isopropoxide added to the silylated polyurethane resin compared to DBDTL, or alternatively in terms of weight fraction metal in the silylated polyurethane resin, with approximately 8 times less Titanium then Tin. The effectivity of the POMS far exceeds the expectations based on a metal content comparison.

Example 3 (According to the Present Invention)

A solution of 3.3 wt % of isobutyl POMS titanium isopropoxide in toluene was prepared by dissolving the catalyst in the solvent in an ultrasonic bath for 30 min. at RT, followed by mixing at 2500 rpm for 6 min. This solution was formulated with silylated polyurethane resin 1. The solution comprises 94.1 wt % silylated polyurethane resin and 6.9 wt % isobutyl POMS titanium isopropoxide. The mixture was flushed with nitrogen and mixed at 2500 rpm for 5 min. The final content of isobutyl POMS titanium isopropoxide in the silylated polyurethane resin was 0.23 wt %. Castings of 500 micrometers were made and cure characteristics were studied with a BK dryer recorder.

Start open time: 43 min, end of scratch time: 115 min.

Example 4 (Comparative Example: Sn Cured Silylated Polyurethane Resin)

A mixture of 6.8 wt % of dibutyl tin dilaurate (DBTDL) with toluene was prepared by shearing the mixture at 2500 rpm for 5 min. This solution was formulated with silylated polyurethane resin 1. The solution comprises 93.1 wt % silylated polyurethane resin and 6.9 wt % DBTDL solution. The mixture was flushed with nitrogen and mixed at 2500 rpm for 5 min. The final content of metal DBTDL in the silylated polyurethane resin was 0.47 wt %. Castings of 500 micrometers were made and cure characteristics were studied with a BK dryer recorder.

Start open time: 45 min, end of scratch time: 120 min.

Examples 3 and 4 have demonstrated that similar cure characteristics were obtained with half the amount of isobutyl POMS titanium isopropoxide added to the silylated polyurethane resin compared to DBDTL, or alternatively in terms of weight fraction metal in the silylated polyurethane resin, with approximately 8 times less Titanium then Tin. The effectivity of the POMS far exceeds the expectations based on a metal content comparison.

Example 5 (Comparative Example: Sn Cured Silylated Polyurethane Resin)

A mixture of 3.3 wt % of dibutyl tin dilaurate (DBTDL) with toluene was prepared by shearing the mixture at 2500 rpm for 5 min. This solution was formulated with silylated polyurethane resin 1. The solution comprises 93.1 wt % silylated polyurethane resin and 6.9 wt % DBTDL solution. The mixture was flushed with nitrogen and mixed at 2500 rpm for 5 min. The final content of metal DBTDL in the silylatyed polyurethane resin was 0.23 wt %. Castings of 500 micrometers were made and cure characteristics were studied with a BK dryer recorder.

Start open time: 65 min, end of scratch time: 160 min.

Examples 3 and 5 have demonstrated that similar concentrations of DBTDL and isobutyl POMS titanium isopropoxide (in wt %) yielded higher cure rates for the POMS catalysed resin, or alternatively in terms of weight fraction metal in the silylated polyurethane resin, with approximately 4 times less Titanium then Tin. The effectivity of the POMS far exceeds the expectations based on a metal content comparison.

Example 6 (According to the Present Invention)

A solution of 1.63 wt % of isobutyl POMS titanium isopropoxide in toluene was prepared by dissolving the catalyst in toluene in an ultrasonic bath for 30 min. at RT, followed by mixing at 2500 rpm for 6 min. This solution was formulated with silylated polyurethane resin 1. The solution comprises 93.1 wt % silylated polyurethane resin and 6.9 wt % isobutyl POMS titanium isopropoxide). The mixture was flushed with nitrogen and mixed at 2500 rpm for 5 min. The final content of isobutyl POMS titanium isopropoxide in the silylated polyurethane resin was 0.119 wt %. Castings of 500 micrometers were made and cure characteristics were studied with a BK dryer recorder.

Start open time: 56 min, end of scratch time: 300 min.

Example 7 (Comparative Example: Sn Cured Silylated Polyurethane Resin)

A mixture of 1.63 wt % of dibutyl tin dilaurate (DBTDL) with toluene was prepared by shearing the mixture at 2500 rpm for 5 min. This solution was formulated with silylated polyurethane resin. The solution comprises 93.1 wt % silylated polyurethane resin and 6.9 wt % DBTDL solution. The mixture was flushed with nitrogen and mixed at 2500 rpm for 5 min. The final content of metal DBTDL in the silylated polyurethane resin was 0.119 wt %. Castings of 500 micrometers were made and cure characteristics were studied with a BK dryer recorder.

Start open time: 90 min, end of scratch time: 250 min.

Examples 6 and 7 have demonstrated that similar concentrations of DBTDL and isobutyl POMS titanium isopropoxide (in wt %) yielded higher cure rates for the POMS catalysed resin, or alternatively in terms of weight fraction metal in the silylated polyurethane resin, with approximately 4 times less Titanium then Tin. The effectivity of the POMS far exceeds the expectations based on a metal content comparison.

Start opening time values (in minutes) of examples 3 to 7 are shown in the FIG. 1.

It is to be understood that although preferred embodiments and/or materials have been discussed for providing embodiments according to the present invention, various modifications or changes may be made without departing from the scope and spirit of this invention.

The invention claimed is:

1. A composition comprising at least one silylated polyurethane compound comprising an alkoxysilyl group, a silanol group, or combinations thereof and at least one tin-free polyhedral oligomeric metallo silsesquioxane curing agent.

2. The composition according claim 1, wherein said at least one tin-free polyhedral oligomeric metallo silsesquioxane curing agent is a compound of formula (I):

27

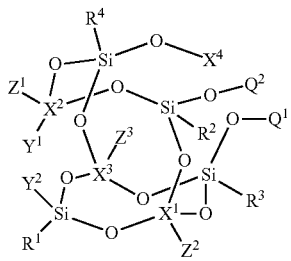

(I)

wherein
$X^1$, $X^2$, and $X^3$ are each independently selected from Si or $M^1$, wherein $M^1$ is selected from the group consisting of s and p block metals with the exclusion of tin and d and f block transition metals, lanthanide and actinide metals, and metalloids;
$Z^1$, $Z^2$ and $Z^3$ are each independently selected from $L^2$, $R^5$, $R^6$, or $R^7$; wherein $L^2$ is selected from —OH or —O—$C_{1-10}$ alkyl;
$Y^1$ and $Y^2$ are each independently —O-$M^2$-$L^3$; or $Y^1$ and $Y^2$ are linked together and form —O-$M^2(L^3)$-O— or —O—; wherein $L^3$ is selected from OH or —O—$C_{1-10}$ alkyl; and $M^2$ is selected from the group consisting of s and p block metals with the exclusion of tin and d and f block transition metals, lanthanide and actinide metals, and metalloids;
$R^1$, $R^2$, $R^3$, $R^4$, $R^5$, $R^6$, and $R^7$ are each independently selected from substituted or unsubstituted $C_{1-20}$ alkyl, substituted or unsubstituted $C_{3-6}$ cycloalkyl, substituted or unsubstituted $C_{2-20}$ alkenyl, or substituted or unsubstituted $C_{6-10}$ aryl;
and
$X^4$ is -$M^3L^1$, or $M^3$, and $Q^1$ and $Q^2$ are each a single bond linked to $M^3$; wherein $L^1$ is selected from —OH or —O—$C_{1-10}$ alkyl, and $M^3$ is selected from the group consisting of s and p block metals with the exclusion of tin and d and f block transition metals, lanthanide and actinide metals, and metalloids;
or
$X^4$ is -$M^3L^1$; and $Q^2$ is a single bond linked to $M^3$; and $Q^1$ is -$M^4L^4$ or —$SiR^{38}$; wherein $M^4$ is selected from the group consisting of s and p block metals with the exclusion of tin and d and f block transition metals, lanthanide and actinide metals, and metalloids; wherein $L^4$ is selected from —OH or alkyl, and $R^{38}$ is selected from substituted or unsubstituted $O_{1-20}$ alkyl, substituted or unsubstituted $O_{3-6}$ cycloalkyl, substituted or unsubstituted $O_{2-20}$ alkenyl, or substituted or unsubstituted $O_{6-10}$ aryl;
or
$X^4$, $Q^1$ and $Q^2$ are each independently -$M^3L^1$;
or
$X_4$ is —Si($R^{38}$)—O-$M^3L^1$; $Q^2$ is a single bond linked to the Si of $X^4$; and $Q^1$ is -$M^4L^4$;
or
$X^4$ is —Si($R^{38}$)—O-$M^3L^1$; $Q^2$ is a single bond linked to the Si of $X^4$; and $Q^1$ is a single bond linked to the $M^3$ of $X^4$.

3. The composition according to claim 2, wherein $X^1$, $X^2$, $X^3$ are each independently Si;
$X^4$ is -$M^3L^1$; and $Q^1$ and $Q^2$ are each a single bond linked to $M^3$; wherein $M^3$ is Ti and $L^1$ is O-i-propyl;
$Z^1$, $Z^2$ and $Z^3$ are each independently $C_{1-6}$ alkyl;
$R^1$, $R^2$, $R^3$, $R^4$ are each independently $C_{1-6}$ alkyl;
$Y^1$ and $Y^2$ are linked together and form —O—.

28

4. The composition according to claim 2, wherein $M^1$, $M^2$, $M^3$ and $M^4$ each independently are selected from the group consisting of Ti, Zr and Hf.

5. The composition according to claim 1, wherein said at least one tin-free polyhedral oligomeric metallo silsesquioxane curing agent is a compound of formula (II):

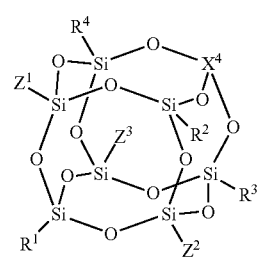

(II)

wherein $X^1$, $X^2$, and $X^3$ are each independently selected from Si or $M^1$, wherein $M^1$ is selected from the group consisting of s and p block metals with the exclusion of tin and d and f block transition metals, lanthanide and actinide metals, and metalloids;
$Z^1$, $Z^2$ and $Z^3$ are each independently selected from $L^2$, $R^5$, $R^6$, or $R^7$; wherein $L^2$ is selected from —OH or —O—$C_{1-10}$ alkyl;
$Y^1$ and $Y^2$ are each independently —O-$M^2$-$L^3$; or $Y^1$ and $Y^2$ are linked together and form faun —O-$M^2(L^3)$-O— or —O—; wherein $L^3$ is selected from OH or —O—$C_{1-10}$ alkyl; and $M^2$ is selected from the group consisting of s and p block metals with the exclusion of tin and d and f block transition metals, lanthanide and actinide metals, and metalloids;
$R^1$, $R^2$, $R^3$, $R^4$, $R^5$, $R^6$, and $R^7$ are each independently selected from substituted or unsubstituted $C_{1-20}$ alkyl, substituted or unsubstituted $C_{3-6}$ cycloalkyl, substituted or unsubstituted $C_{2-20}$ alkenyl, or substituted or unsubstituted $C_{6-10}$ aryl;
and $X^4$ is -$M^3L^1$, or $M^3$, and $Q^1$ and $Q^2$ are each a single bond linked to $M^3$; wherein $L^1$ is selected from OH or —O—$C_{1-10}$ alkyl, and $M^3$ is selected from the group consisting of s and p block metals with the exclusion of tin and d and f block transition metals, lanthanide and actinide metals, and metalloids;
or
$X^4$ is -$M^3L^1$; and $Q^2$ is a single bond linked to $M^3$; and $Q^1$ is -$M^4L^4$ or —$SiR^{38}$; wherein $M^4$ is selected from the group consisting of s and p block metals with the exclusion of tin and d and f block transition metals, lanthanide and actinide metals, and metalloids; wherein $L^4$ is selected from —OH or —O—$C_{1-10}$ alkyl, and $R^{38}$ is selected from substituted or unsubstituted $C_{1-20}$ alkyl, substituted or unsubstituted $C_{3-6}$ cycloalkyl, substituted or unsubstituted $C_{2-20}$ alkenyl, or substituted or unsubstituted $C_{6-10}$ aryl;
or
$X^4$, $Q^1$ and $Q^2$ are each independently -$M^3L^1$;
or
$X_4$ is —Si($R^{38}$)—O-$M^3L^1$; $Q^2$ is a single bond linked to the Si of $X^4$; and $Q^1$ is -$M^4L^4$;
or
$X^4$ is —Si($R^{38}$)—O-$M^3L^1$; $Q^2$ is a single bond linked to the Si of $X^4$; and $Q^1$ is a single bond linked to the $M^3$ of $X^4$.

6. The composition according to claim 1, wherein said at least one tin-free polyhedral oligomeric metallo silsesquioxane curing agent is a compound of formula (III):

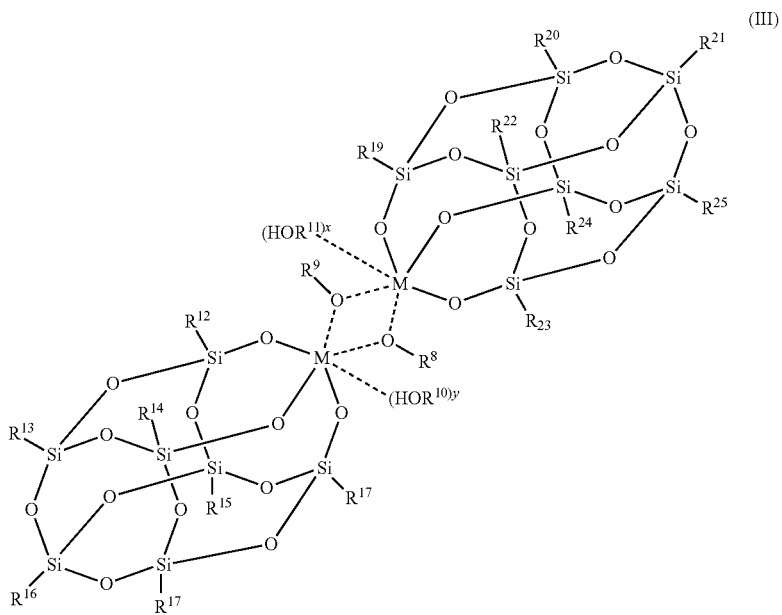

wherein M is selected from the group consisting of s and p block metals with the exclusion of tin and d and f block transition metals, lanthanide and actinide metals, and metalloids;
x is an integer selected from 0 or 1;
y is an integer selected from 0 or 1;
$R^8$ and $R^9$ are each independently $C_{1-20}$ alkyl;
$R^{10}$ and $R^{11}$ are each independently $C_{1-20}$ alkyl;
and $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, and $R^{25}$ are each independently selected from substituted or unsubstituted $C_{1-20}$ alkyl, substituted or unsubstituted $C_{3-6}$ cycloalkyl, substituted or unsubstituted $C_{2-20}$ alkenyl, or substituted or unsubstituted $C_{6-10}$ aryl.

7. The composition according to claim 6, wherein x and y are each 0; M is Ti; $R^8$, $R^9$, $R^{10}$ and $R^{11}$ are each independently $C_{1-6}$ alkyl; and $R^{12}$ to $R^{25}$ are each independently $C_{1-6}$ alkyl.

8. The composition according to claim 7, wherein $R^8$ and $R^9$ are each i-propyl; and $R^{12}$ to $R^{25}$ are each i-butyl.

9. The composition according to claim 7, wherein $R^8$ and $R^9$ are each i-propyl; and $R^{12}$ to $R^{25}$ are each i-octyl.

10. The composition according to claim 1, further comprising a silylated polymer selected from the group consisting of silylated silicones, silylated polyethers (MS polymers), silylated polycarbonates, silylated polyolefins, silylated polyesters, silylated polyacrylates, silylated polyvinyl acetates, mixtures thereof and copolymers thereof.

11. The composition according to claim 1, wherein said silylated polyurethane compound is obtained by reaction of at least one isocyanate with at least one isocyanate reactive compound and with at least one alkoxysilane compound and/or silanol compound.

12. The composition according to claim 11, wherein the alkoxysilane compound is an aminoalkoxysilane.

13. The composition according to claim 1, wherein the amount of said tin-free polyhedral oligomeric metallo silsesquioxane compound ranges from 0.001 wt % to 5 wt %, based on total weight of the composition.

14. The composition according to claim 1, wherein said composition further comprises one or more additives selected from the group consisting of fillers, adhesion promoters, moisture scavengers, plasticizers, UV stabilizers, thixotropic agents, or combinations thereof.

15. The composition according to claim 1, wherein said composition contains less than 0.001 wt % of tin.

16. A process of curing a composition according to claim 1, comprising the step of: contacting at least one silylated polyurethane compound comprising an alkoxysilyl group, a silanol group, or combinations thereof with at least one tin-free polyhedral oligomeric metallo silsesquioxane curing agent thereby obtaining a cured composition.

17. The composition according to claim 1, wherein the amount of said tin-free polyhedral oligomeric metallo silsesquioxane curing agent is ranging from 0.01 to 2 wt %, based on total weight of the composition.

18. The composition according to claim 1, wherein the amount of said tin-free polyhedral oligomeric metallo silsesquioxane curing agent is ranging from 0.1 to 2 wt %, based on total weight of the composition.

19. The composition according to claim 1, wherein the curing agent increases the hydrolysis and condensation rate of said alkoxysilyl and silanol groups of the silylated polyurethane compound.

20. The process according to claim 16, wherein the curing agent increases the hydrolysis and condensation rate of said alkoxysilyl and silanol groups of the silylated polyurethane compound.

* * * * *